United States Patent
Gorra

(10) Patent No.: US 6,461,685 B2
(45) Date of Patent: Oct. 8, 2002

(54) METHOD FOR USING VEHICLE TIRE DRESSING APPLICATOR

(75) Inventor: William M. Gorra, West Hartford, CT (US)

(73) Assignee: Simoniz USA, Inc., Bolton, CT (US)

(*) Notice: Subject to any disclaimer, the term of this patent is extended or adjusted under 35 U.S.C. 154(b) by 0 days.

(21) Appl. No.: 09/790,466

(22) Filed: Feb. 22, 2001

(65) Prior Publication Data

US 2001/0037765 A1 Nov. 8, 2001

Related U.S. Application Data

(62) Division of application No. 09/565,798, filed on May 5, 2000.

(51) Int. Cl.$^7$ ................................................. B05D 1/28
(52) U.S. Cl. .................. 427/429; 118/264; 118/266; 134/45; 134/123; 134/129; 15/97.3
(58) Field of Search .......................... 427/429; 118/264, 118/266; 15/53.4, 53.3, 97.3; 134/45, 123, 125, 129

(56) References Cited

U.S. PATENT DOCUMENTS 4,958,587 A * 9/1990 Fogal, Sr. et al. .......... 118/206
6,260,225 B1 * 7/2001 Bowman .................... 15/53.4

* cited by examiner

Primary Examiner—Katherine A. Bareford
(74) Attorney, Agent, or Firm—McCormick, Paulding & Huber LLP

(57) ABSTRACT

A method is disclosed for using a vehicle tire dressing apparatus which includes left and right dressing applicators situated alongside a vehicle conveying track, the dressing applicators being moveable individually into contacting engagement with tires on left and right sides of a vehicle in the track. Each applicator has an applicator pad mounted to a mount bar and the mount bar is hinged to a frame which allows articulation of the applicator pad into and out of contact with the tires. The applicator pad is configured with a plurality of orifices, each of which orifices receives fluid sprayed from a complimentary spray nozzle. Each orifice has an elongated capillary which assists dispersing fluid into the pad. The spray nozzles emit fluid into the pads for a predetermined amount of time, the spraying being initiated by movement of the vehicle into proximity with the tire dressing assembly.

40 Claims, 5 Drawing Sheets

METHOD FOR USING VEHICLE TIRE DRESSING APPLICATOR

CROSS REFERENCE TO RELATED APPLICATION

This application is a divisional of U.S. patent application Ser. No. 09/565,798, filed May 5, 2000 entitled "VEHICLE TIRE DRESSING APPLICATOR AND METHOD FOR ITS USE, and which is herein incorporated by reference.

BACKGROUND OF THE INVENTION

1. Technical Field

This invention pertains generally to a method of using an apparatus for applying a fluid to vehicle tires and, in particular, to a method for using an apparatus for automatically applying a dressing fluid to the tires of a vehicle being conveyed within an automatic vehicle washing facility.

2. Background art

It is well known in the vehicle washing industry to perform various automated steps during the vehicle washing process as the vehicle is conveyed through a washing facility. Over the years, numerous advances to such washing facilities have expedited and improved the washing process while decreasing the manpower requirements of the facility. For instance, the development of a cost-efficient, effective air drying system for vehicles eliminated the need to dry vehicles manually after the washing procedure is completed.

Historically, patrons to vehicle washing facilities have had the option of paying an additional fee and having a dressing fluid applied to the vehicle tires near the exit of the washing facility. The dressing fluid, which can be either water-or solvent-based, is applied directly to the tires to improve their appearance and provide a finishing touch to the exterior of the vehicle. There are various known methods for applying tire dressing fluids, none of which have successfully eliminated or even reduced manpower requirements, or improved the efficiency with which the dressing fluids are consumed by the washing facility.

One method of dressing vehicle tires is by manually applying the dressing as the vehicle approaches the washing facility exits or when the car has been moved outside the washing facility. In an inherently costly and labor intensive process, an attendant applies the fluid manually to each tire. Understandably, there is difficulty in controlling the amount of tire dressing fluid that is used by the attendant. One attendant may apply the fluid liberally to the applicator pad or towel, while another attendant may not use enough fluid. The result is that patrons may receive inconsistent service, and the cost of the tire dressing service is unnecessarily inflated to cover the cost of manpower and the dressing fluid consumed by the facility.

There have also been attempts to apply the dressing fluid automatically as the vehicle is prepared to exit the washing facility. Typically, one or more spray nozzles are used to spray fluid directly on the tires. While an automatic spraying device may eliminate the manual step of applying the fluid, spraying the tires automatically creates other problems.

Probably the worst problem is that the tires and wheels are usually sprayed together, so a large quantity of dressing fluid is wasted immediately when the wheels are sprayed. The tires must then be wiped to smooth any dripping fluid, and fluid must be removed completely from the wheels since the fluid can corrode certain types of wheels. As a result, instead of reducing manpower requirements by spraying tires with fluid, the amount of manual labor may actually be increased by the wiping requirements. There are also additional costs associated with products such as towels and gloves needed by the attendants to wipe down the tires and wheels.

Another problem with spraying tires with fluid is that the attendants who subsequently wipe the wheels and tires often do so outside the facility, which allows fluid to drip from the tires and wheels before the vehicle reaches the attendant. Especially in the winter, fluid on the ground may pose a hazard to patrons and employees walking over the dripped fluid. There may also be environmental concerns when dressing fluid drains from the washing facility property.

Still another problem with automatic tire spraying equipment is the result when the vehicle conveyor in the washing facility malfunctions. It is not infrequent that a vehicle jumps a roller or a stop on the conveyor which is used to pull the vehicle through the washing facility. The rollers or stops are typically linked to a pull chain driven and monitored by a computer control system. The computer control system tracks the location of the vehicle and controls the washing process by the locations of the roller or stop. If the vehicle is inadvertently moved away from the reference stop or roller and the computer controller does not recognize the move, the automatic spray equipment may miss the tires and possibly spray the vehicle body instead.

A method is needed which effectively and efficiently applies a dressing fluid to vehicle tires in a vehicle washing facility. The present invention is directed to such a method.

SUMMARY OF THE INVENTION

It is an object of the present invention to provide a method for using an apparatus which automatically applies a dressing fluid to the tires of a vehicle that is being conveyed through a vehicle washing facility.

It is another object of the present invention to provide a method for using an apparatus which eliminates labor-intensive, manual tasks in applying tire dressing fluid to vehicle tires in a car washing facility.

It is yet another object of the present invention to provide a method for using an apparatus which applies a predetermined amount of tire dressing fluid to vehicle tires and avoid excessive product waste.

According to the present invention, a tire dressing assembly for applying dressing liquid to vehicle fires in a vehicle washing facility includes a pair of mechanical applicators which move an associated pair of applicator pads into contacting engagement with the tires as the vehicle is being conveyed in the washing facility. The applicator pads are soaked automatically with the dressing fluid via an arrangement of spray nozzles as the vehicle approaches the tire dressing assembly. A pair of adjustable hydraulic cylinders press the mechanical applicators and the soaked applicator pads against the tires to transfer the dressing fluid to the tires as the vehicle is conveyed through the tire dressing assembly.

According to one embodiment of the invention, the method utilizes applicator pads having a concave contact surface that conforms to the shape of the tire sidewall.

According to another embodiment of the invention, the method utilizes applicator pads having a convex contact surface that compresses when engaged with the tire sidewall.

One advantage of the present invention is the cost savings realized by automatically applying a dressing fluid to vehicle fires and eliminating labor-intensive, manual fluid application steps.

Another advantage of the present invention is the cost savings realized by efficiently controlling the amount of tire dressing fluid that is applied to vehicle tires.

Still yet another advantage of the present invention is that vehicles can be cleaned more efficiently in the washing facility by automatically applying tire dressing fluid.

These and other objects, features and advantages of the present invention will become more apparent in the light of the following detailed description of best mode embodiments thereof as illustrated in the accompanying drawings.

DESCRIPTION OF THE PREFERRED EMBODIMENT

Figure 1:
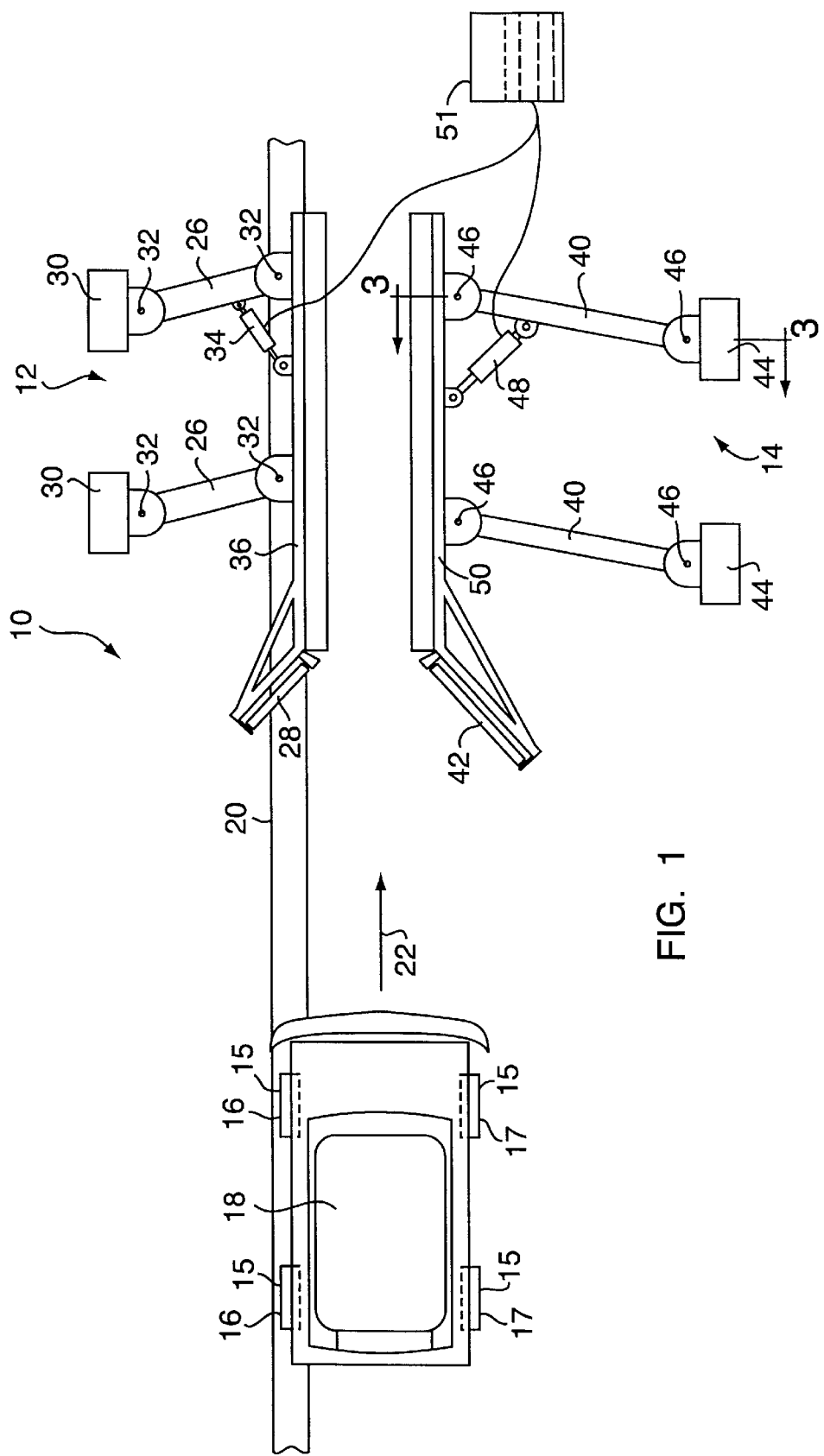
FIG. 1 is a schematic plan view of a tire dressing assembly utilized one embodiment of the present invention showing a vehicle moving toward left and right tire dressing applicators.
Figure 2:
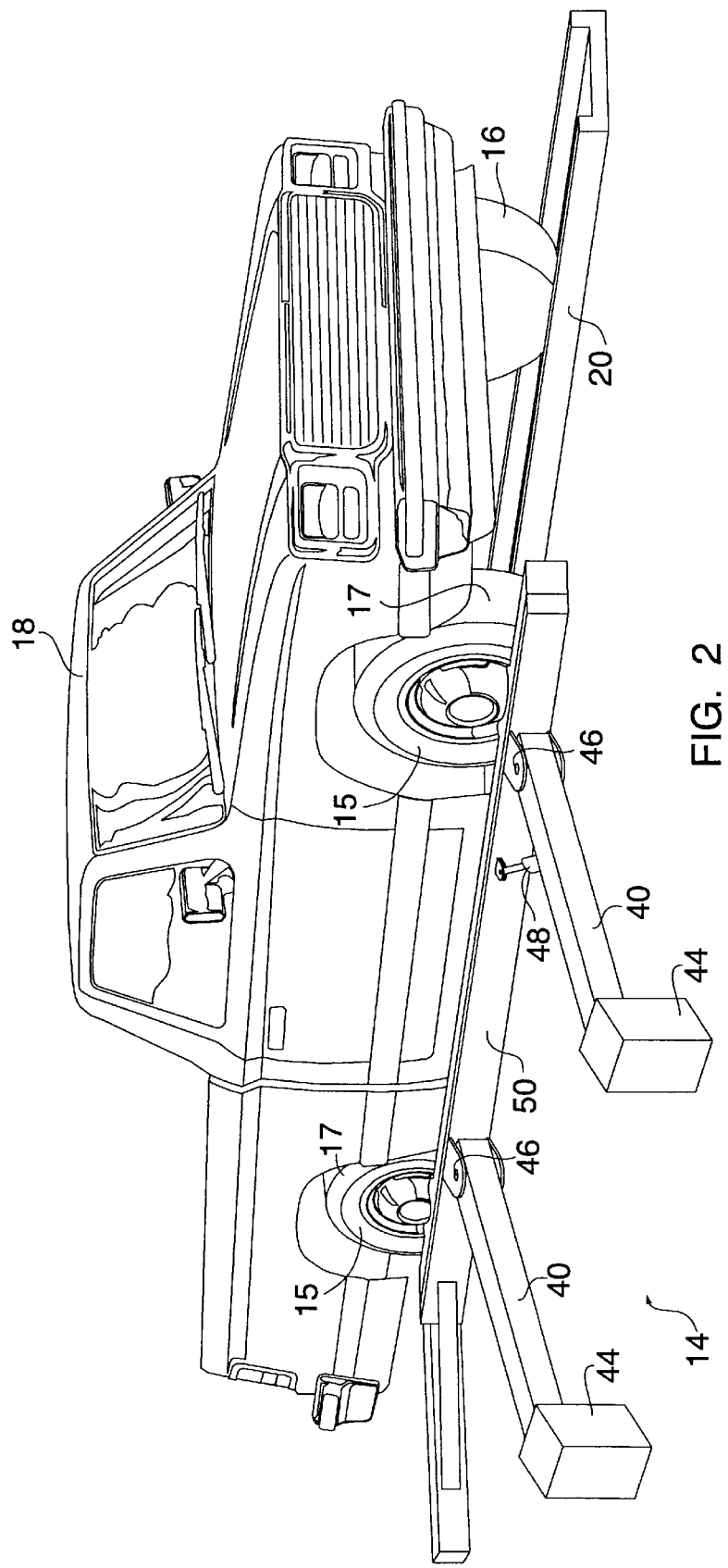
FIG. 2 is a somewhat enlarged, schematic perspective view of the utilized tire dressing assembly of FIG. 1 showing the vehicle engaged with the right tire dressing applicator.

Referring to FIGS. 1–2, a vehicle tire dressing assembly 10 utilized in one embodiment of the present invention includes a left applicator 12 and a right applicator 14 which cooperate to apply a dressing fluid to sidewalls 15 of left and right tires 16, 17 of a vehicle 18. The vehicle 18 is conveyed along a track 20 of a vehicle washing facility in a direction indicated by arrow 22, the final portion of the washing facility being shown in FIGS. 1 & 2. The track 20 includes an arrangement of components, including a computer control system and conveying equipment (not shown), which are considered well-known in the art. The control system is used by the washing facility to monitor and determine the exact position of the vehicle in the track 20. It is intended that the present invention utilize the existing computer control system of the washing facility to initiate application of the fluid, as will be discussed in detail below.

The left and right applicators 12, 14 are deflected by the vehicle from dormant positions shown generally in FIG. 1 to contacting positions shown in FIG. 2 wherein each applicator 12, 14 automatically positions and adjusts itself to the width of the vehicle into a contacting orientation with the sidewalls of the tires 16, 17. The left applicator 12 moves in response to arrival of the left tires 16, and includes a pair of left swing arms 26, a left deflector roller 28, a pair of anchor posts 30, four pivot assemblies 32, a left cylinder 34, and a left mount bar 36. The pivot assemblies 32 allow the mount bar 36 to maintain a generally parallel relationship with the track 20. The left applicator 12 therefore remains in contacting engagement simultaneously with both left tires 16. Because the left tires 16 are always kept within the track 20, the left applicator 12 can effectively engage the tires with a minimal range of motion. In other words, as known in the industry, the left tires 16 provide a reference point for various mechanisms in the washing facility, including the present invention, which automatically adjusts to various vehicle widths by locating the right side of the vehicle 18.

The right applicator 14 is configured slightly differently from the applicator assembly 12 to articulate and permit passage of vehicle 18 upon arrival of the right tires 17, and includes a pair of right swing arms 40, a right deflector roller 42, a pair of anchor posts 44, four pivot assemblies 46, a right cylinder 48, and a right mount bar 50. The pivot assemblies 46 are identical to pivot assemblies 32 of the left applicator 12, but the swing arms 40 are slightly longer than swing arms 26. With the longer swing arms 40, the applicator 14 articulates in a larger arc compared to the applicator assembly 12. During articulation, the right mount bar 50 maintains a generally parallel relationship to the left mount bar 36 and to the track 20.

The left cylinder 34 is mounted between the left mount bars 36 and one of the swing arms 26, and the right cylinder 48 is mounted between the right mount bar 50 and one of the swing arms 40. Both of the cylinders 34, 48 are hydraulically actuated and are positioned so that when they are extended, the applicators 12, 14 are moved into the path of the vehicle being conveyed along the track 20. A fluid reservoir 51 is coupled to each cylinder 34, 48 and is pressurized with air so that the applicators 12, 14 are pressed against the tires with a desired amount of force once the vehicle is moved into engagement with the assembly 10. The pressure in the cylinders 34, 48 is adjustable so that the applicators can apply a desired amount of force to the tires by selecting an appropriate level of air pressure.

The left and right deflector rollers 28, 42 are positioned and oriented with respect to the mount bars 36, 50 to allow the vehicle 18 to impact the applicators 12, 14, force the applicators outwardly in a camming action, and allow entry of the vehicle 18 between the applicators. The right roller 42 has a slightly longer length than the left roller 28 to account for various vehicle widths.

Figure 3:
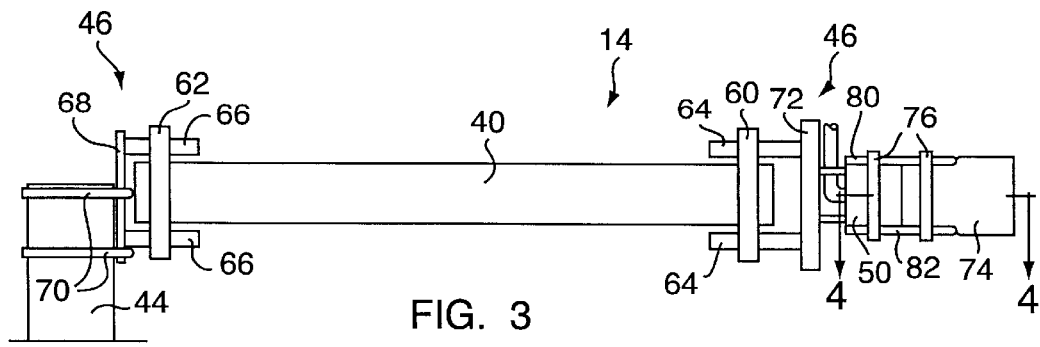
FIG. 3 is a cross-sectional view of the utilized tire dressing apparatus of FIG. 1 taken along the lines 3—3.

Referring to the right applicator 14 shown in FIG. 3, the pivot assemblies 46 connect the swing arm 40 between the anchor post 44 and mount bar 50, and includes inner and outer pivot pins 60, 62, and inner and outer support bearings 64, 66. The outer support bearings are attached to an outer bearing mount 68 which, in turn, is fixed to the anchor post 44 via a pair of U-bolts 70. The U-bolts allow vertical movement of the applicator 14 relative to the ground by loosening the U-bolts 70 and moving the outer bearing mount 68 along the anchor post 44. The outer pivot pin 62 anchors the swing arm to the anchor post. The inner support bearings 64 are attached to an inner bearing mount 72. The inner pivot pin 60 pivotally couples the swing arm 40 to the mount bar 50. The swing arm, mount bar, and anchor post are constructed of aluminum, but these components can be constructed from other structural materials such as steel as long as rapid corrosion is prevented. It should be understood that the left applicator 12 has an arrangement of components that is, except for the length of the swing arms, substantially identical to that of the right applicator 14.

An elongated applicator pad 74 is bolted to the mount bar 50 via an arrangement of pad mount bolts 76 and upper and lower mount plates 80, 82. The applicator pad 74 is manufactured from either a hydrophobic or hydrophylic foam, depending on whether a solvent-based or a water-based dressing fluid is used. Hydrophobic foam is compatible for use with solvent-based fluid because it will absorb such fluid, and hydrophylic foam is compatible for use with water-based fluid. A benefit of using the hydrophobic foam is that the applicator pad 74 will retain the dressing fluid without absorbing water remaining on the tires from prior washing operations.

The foam is "reticulated," meaning that when manufactured, a known mechanical or chemical process is used to produce an inner arrangement of cells which increase the amount of fluid the foam is capable of retaining. Reticulating the foam also increases the ability of the foam to release the fluid to the tires when required to do so.

Figure 5:
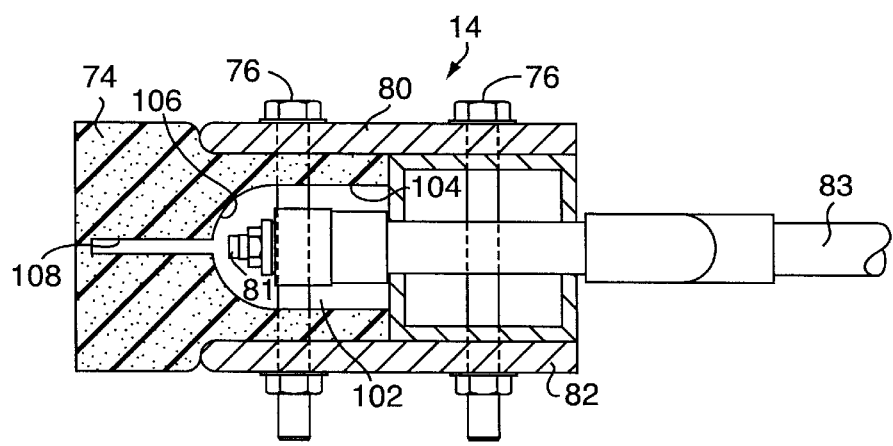
FIG. 5 is a cross sectional view of the utilized tire dressing apparatus of FIG. 4 taken along the lines 5—5 showing the applicator pad clamped between upper and lower mount plates.
Figure 4:
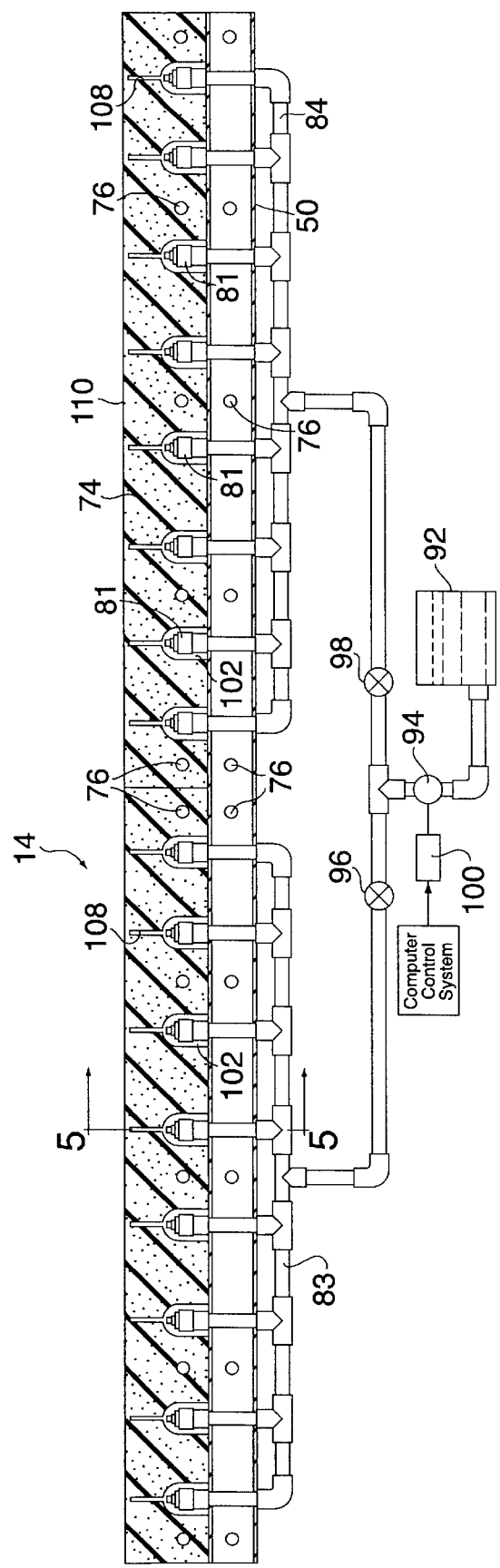
FIG. 4 is a cross sectional view of the utilized tire dressing apparatus of FIG. 3 taken along the lines 4—4 illustrating an arrangement of spray nozzles positioned within an applicator pad.

Referring to FIGS. 4–5, the right applicator 14 includes a quantity of sixteen spray nozzles 81 mounted in an equally-spaced arrangement along the mount bar 50. The spray nozzles 81 are mounted such that they extend through the mount bar 50 and into the applicator pad 74. Each nozzle produces a conical spray pattern so as to effectively spray the fluid into the pad 74. Eight of the spray nozzles 81 are connected to a forward supply line 83 and soak a section of the pad 74 which first comes into contact with the vehicle. The remaining eight spray nozzles 81 are connected to a rear supply line 84. Each of the supply lines 83, 84 is connected to a fluid supply system 90 which can supply either the front eight nozzles 81, the rear eight nozzles 81, or all of the nozzles 81 to spray the fluid.

The fluid supply system 90 includes a reservoir 92 which stores the fluid, a pump 94 which forces the fluid to the spray nozzles 81, and valves 96,98 which control fluid flow to the front and rear supply lines 83, 84, respectively. A conventional timer 100 provide power to the pump 94, and the timer 100 is triggered or actuated by the computer control system of the washing facility.

The applicator pad 74 is configured with a quantity of sixteen orifices 102 which loosely receive the spray nozzles 81 such that dressing fluid sprayed from the nozzles 81 is dispersed uniformly inside the orifice 102. Each orifice 102 includes a cylindrical portion 104, a concave end 106 and a blind bore or capillary 108 extending from the concave end 106 toward a contact surface 110 of the applicator pad 74. The capillary ends approximately 0.25 inches short of the contact surface 110 so that fluid wicked into the capillary is absorbed by the pad 74.

The dimensions of the contact surface 110 can be optimized according to the size of the tire being dressed and the point at which the pad 74 makes contact with the tires. That is, if the pad 74 contacts the tire in proximity with the area where the tire meets the ground, it is necessary to provide a larger (or taller) contact surface 110 so that the pad 74 coats the entire width of sidewall 15 from the ground to the wheel. On the other hand, if the pad 74 contacts the tire in proximity with the rotational axis of the wheel, then the pad is theoretically capable of contacting the entire sidewall 15 of the tire, regardless of the size of the contact surface 110, due to rotation of the tire.

Figure 6:
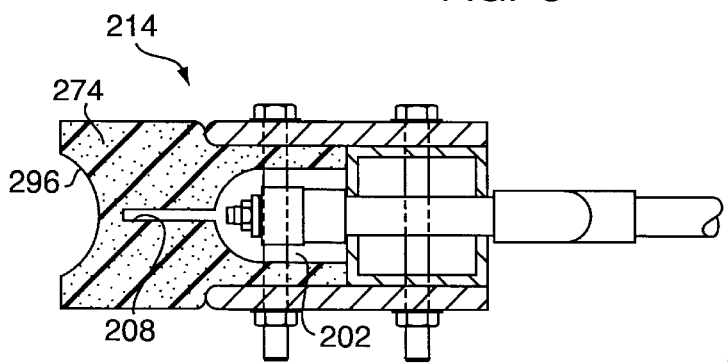
FIG. 6 is a cross sectional view of the present invention which utilizes the tire dressing apparatus of FIG. 5 reduced slightly in size and showing an applicator pad having a concave contact surface.

Referring to FIG. 6, method of the present invention, utilizes a right applicator, designated by numeral 214, and which is utilized in a second embodiment of the present invention, includes an applicator pad 274 having a concavely-shaped contact surface 296 that conforms to the surface of the tire in a manner different from pad 74. In particular, it can be seen that pad 274 is more readily able to conform the curved surface of the fire and coat the portions of the fire closest the wheel and the tread. The pad 274 has an arrangement of capillaries 208 which extend from the orifices 202 and end short of the contact surface 296.

Figure 7:
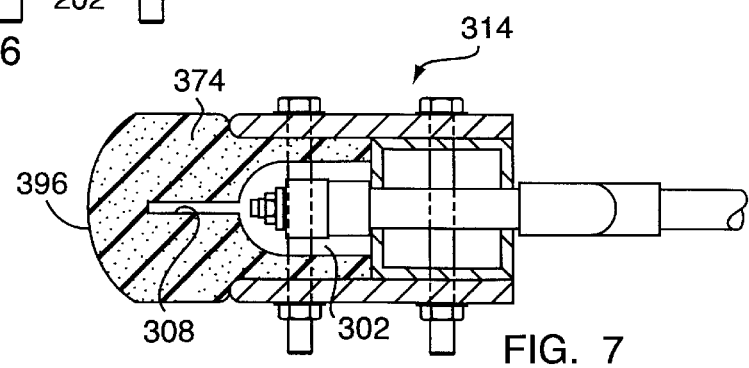
FIG. 7 is a cross sectional view of the tire dressing apparatus of FIG. 5 reduced slightly in size and showing an applicator pad having a convex contact surface which is utilized in a third embodiment of the present invention.

Referring to FIG. 7, method of the present invention, utilizes a right applicator, designated by numeral 314, and which is utilized in a third embodiment of the present invention, includes an applicator pad 374 having a convexly-shaped contact surface 396. The convex shape allows the pad to flex easily upon initially contacting a tire due to the reduced surface area which initially contacts the tire.

Figure 8:
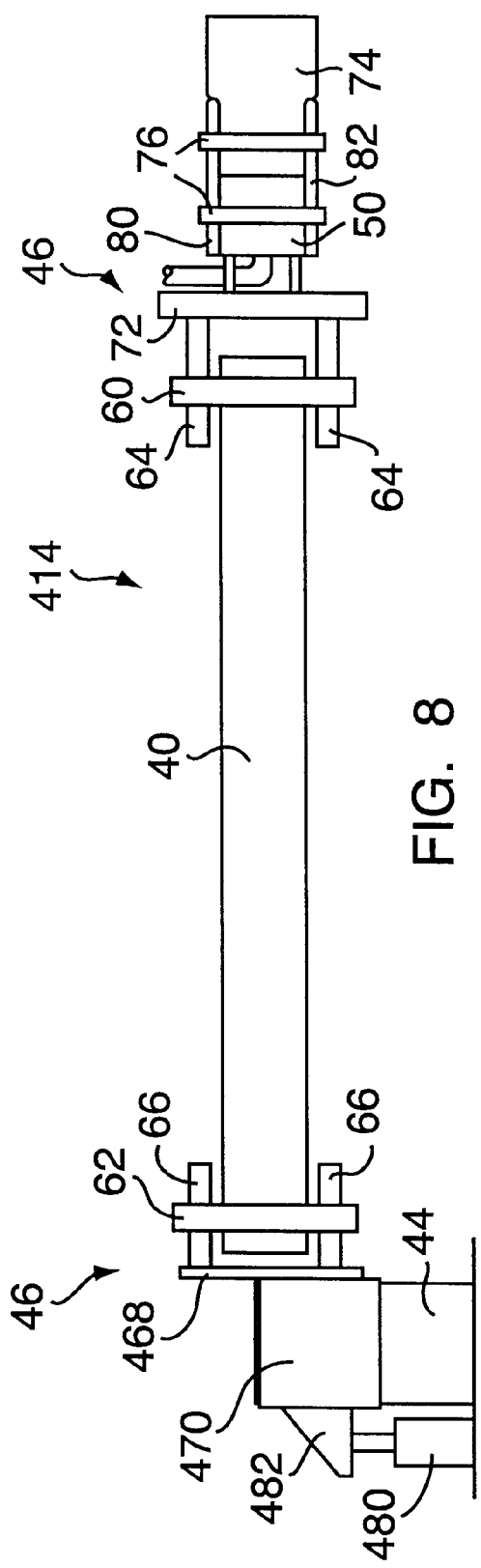
FIG. 8 is a cross-sectional view of the tire dressing apparatus of FIG. 1 taken along the lines 3—3 and showing an applicator moveably coupled to a hydraulic cylinder which is utilized in a fourth embodiment of the present invention.

Referring to FIG. 8, method of the present invention, utilizes a right applicator, designated by numeral 414, and which is utilized in a fourth embodiment of the present invention, includes a sleeve 470 and a means 480, such as a hydraulic or pneumatic cylinder, for driving the sleeve 470 vertically along the anchor post 44. The sleeve 470 is attached with conventional fasteners to an outer bearing mount 468. A tab 482 is attached to the sleeve 470 to receive the means 480. Hence, the vertical position of the applicator 414 can be adjusted as desired by moving the sleeve along the anchor post.

The means 480 is in communication with the computer control system of the washing facility so that the height of the applicator 414 can be adjusted automatically according to the size of the tires being coated, or the height of the body of the vehicle. For a low-profile tire or a vehicle with minimal ground clearance, such as a sports car, it may be desired to lower the applicator as much as possible to avoid rubbing the applicator on the body of the vehicle or the wheels of the vehicle. For vehicles having wheels or hubcaps which protrude outwardly beyond the plane of the tire sidewall, it may be desirable to lower the applicator to avoid possible damage to the applicator.

In operation, when the vehicle arrives at a predetermined location on the track 20 (seen in FIG. 1), a signal is sent from the computer control system to the timer 100 to power the pump 94 for three seconds, thereby pumping fluid to the applicator pads 74. The time period can easily be lengthened or shortened depending on the flow rate of the pump and spray nozzles, or the absorption rate of the pads 74. The pump should be actuated at a position which gives the fluid enough time to soak in thoroughly before the vehicle engages the applicator pads. The valves 96,98 are actuated individually to control delivery of fluid to either the front or the rear supply line 83, 84, or both simultaneously.

The vehicle is moved into engagement with the applicators 12,14, and the pads are then pressed against the tires of the vehicle by the force of the pressurized air in cylinder 51. Air pressure in the reservoir 51 is adjusted until the applicator pads are pressed against the tires with a force that deforms and conforms the applicator pads to the contour of the tire sidewalls 15. The efficiency and effectiveness of the applicator pads can be adjusted by raising or lowering the applicators 12, 14 on their respective anchor posts.

While several preferred embodiments of the novel method for utilizing a tire dressing assembly have been shown and described above, various modifications and substitutions may be made without departing from the spirit and scope of the invention. For example, other type of foams may be used that compatible other types of fluids, and foam having more or less hardness and/or rigidity may be used. In the event that a water-based fluid is applied to the tires, it may be advantageous to adapt a wiping or drying mechanism to remove as much water from the tires as possible before the pad contacts the tire so that water from the tire is not absorbed by the pad. Such a wiping mechanism can be incorporated into the pad by providing an impermeable layer of material on the upper and/or lower surfaces of the pad so that water is wiped from the tires prior to application of the dressing fluid.

Further, it is considered within the scope of the present invention to configure the applicator pads with other arrangements of capillaries, such as lateral capillaries which connect the spray nozzle orifices to each other, thereby changing the distribution characteristics of the dressing fluid in the pad.

It is also considered within the scope of the present invention to arrange the fluid supply lines and fluid supply system such that dressing fluid is pumped to various arrangements of nozzles within the applicator pad. For instance, it may be desirable to connect each supply line to every other spray nozzle so that one supply line can be deactivated and the applicator pad will still be soaked enough to effect proper tire coating. Other types of spray nozzles can be used to spray the fluid in something other than a conical pattern.

Yet further, it is considered within the scope of the present invention to provide applicators which coat a single tire of the vehicle at a time. Such an applicator is useful in a facility other than a washing facility.

It is also considered within the scope of the present invention to fit the tire dressing assembly with an assortment of differently-sized and/or shaped applicator pads. Each applicator would be capable of automatically selecting an appropriately-sized pad for use based upon input received from the computer control system of the washing facility. With such an arrangement, pads can be sized to accommodate tires having a low profile, or larger tires for vehicles such as pickup trucks. An alternative arrangement is to provide several applicator assemblies adjacent one another, each assembly having applicator pads of a different size. A vehicle being processed can be conveyed to the applicator having the appropriately-sized applicator pads for that vehicle.

Still further, it is considered within the scope of the present invention to utilize the applicator assemblies to apply fluids other than dressings, such as cleaner, before or during the time the vehicle is washed.

Accordingly, it is to be understood that the present invention has been described by way of illustration, and not by way of limitation.

I claim:

1. In a vehicle wash facility through which a vehicle moves progressively along a path, a method of automatically coating the sidewall of at least one tire of a vehicle with a fluid comprising the steps of:
    automatically pumping a fluid into an applicator pad when a vehicle is moved to a predetermined position along the path in the vehicle wash facility;
    engaging said applicator pad with a sidewall of the at least one tire;
    moving the applicator pad and the sidewall relative to one another while in engagement, to rub the pad over the entire sidewall applying the fluid to the sidewall; and
    disengaging the applicator pad from the sidewall after the fluid has been applied to the sidewall.

2. The method of claim 1, wherein pumping is completed prior to engaging the applicator pad with the sidewall.

3. The method of claim 1, wherein vertical positioning of said pad is adjusted according to tire size prior to engaging said pad with said tire.

4. The method of claim 1, wherein the step of pumping occurs for a predetermined amount of time.

5. The method of claim 1, wherein the applicator pad is engaged with the sidewall with a predetermined amount of force.

6. The method of claim 1, wherein:
    the pad is an elongated pad; and
    the step of moving includes holding the elongated pad stationary while engaged with the sidewall of the tire and moving the vehicle relative to the stationary elongated pad.

7. The method according to claim 1 wherein the step of automatically pumping a fluid into an applicator pad includes a step of dispensing said fluid into an orifice defined by said applicator pad.

8. The method according to claim 7 wherein the step of dispensing said fluid into an orifice defined by said applicator pad further comprises dispensing said fluid to a plurality of said orifices, a portion of the fluid dispersing throughout said pad via at least one capillary connecting said plurality of orifices one to the other.

9. The method according to claim 1 wherein the applicator pad is elongated having a first portion displaced in the direction of elongation from a second portion, and the step of automatically pumping a fluid into an applicator pad further comprises the steps of pumping said fluid separately into the first and second portions of said applicator pad.

10. The method according to claim 1 wherein the step of engaging the applicator pad with the sidewall of the tire further comprises:
    employing a mount bar for supporting the applicator pad;
    moving the mount bar with the supported pad toward the tire for engaging the applicator pad with the sidewall of the tire.

11. The method according to claim 10 wherein the step of moving the mount bar includes moving the mount bar substantially horizontally for engaging the applicator pad with the sidewall.

12. The method according to claim 1 wherein the step of engaging the applicator pad is also initiated when a vehicle is moved to a predetermined position along the path in the vehicle wash facility.

13. The method according to claim 1 further comprising employing a computer for controlling said automatic coating the sidewall of at least one tire of a vehicle with a fluid.

14. The method according to claim 1 further comprising a step of removing water from the sidewall of the tire prior to engaging said applicator pad therewith.

15. The method according to claim 14 herein the step of removing water from the tire includes drying the tire.

16. The method according to claim 14 wherein the step of removing water from the tire includes a step of wiping the sidewall of the tire.

17. The method according to claim 16 wherein the step of wiping the sidewall of the tire further comprises employing a wiper material on a surface of the applicator pad for wiping water from the sidewall of the tire prior to applying the fluid to the sidewall.

18. The method according to claim 1 wherein said fluid includes a cleaner.

19. The method according to claim 1 further comprising a step of selecting an appropriate applicator pad based on a size of the tire of said vehicle.

20. The method according to claim 1 wherein the step of moving the applicator pad and the sidewall relative to one another occurs while the tire is rotating and mounted to the vehicle.

21. The method according to claim 1 wherein the step of moving the applicator pad and the sidewall relative to one another occurs while the vehicle is moving through the wash facility and the tire is rotating in contact with the ground and the applicator pad is stationary relative to the tire.

22. The method of claim 21 wherein the applicator pad is elongated in the direction of the motion of the vehicle.

23. In a vehicle wash facility, through which a vehicle having a plurality of tires moves along a path through the facility rolling on the tires, a method of automatically coating the sidewall of at least one tire of the vehicle with a fluid, the method comprising the steps of:

moving a vehicle progressively along a path through the vehicle wash facility:

automatically pumping a fluid into an applicator pad when the vehicle is moved to a predetermined position along the path in the vehicle wash facility;

engaging an applicator pad with a sidewall of the at least one tire;

holding the applicator pad stationary while in engagement with the sidewall of the tire while the tire is rotating, to rub the pad over the entire sidewall and apply the fluid to the sidewall; and disengaging the applicator pad from the sidewall after the fluid has been applied to the sidewall.

24. The method of claim 23 wherein the applicator pad is elongated in the direction of movement of the vehicle.

25. The method of claim 23 wherein the step of engaging an applicator pad further comprises a step of adjusting the vertical position of the applicator pad depending on the size of the tire being coated.

26. The method according to claim 23 wherein the step of engaging the applicator pad with the sidewall of the tire further comprises:

employing a mount bar for supporting the applicator pad;

moving the mount bar with the supported pad toward the tire for engaging the applicator pad with the sidewall of the tire.

27. The method according to claim 23 wherein the step of automatically pumping a fluid into an applicator pad includes dispensing said fluid into an orifice defined by said applicator pad.

28. The method according to claim 27 wherein the step of dispensing said fluid into an orifice defined by said applicator pad further comprises dispensing said fluid to a plurality of said orifices, a portion of the fluid dispersing throughout said pad via at least one capillary connecting said plurality of orifices one to the other.

29. The method according to claim 23 wherein the step of pumping occurs for a predetermined amount of time.

30. The method according to claim 23 wherein the step of engaging said applicator pad with a sidewall of the tire includes engaging with a predetermined amount of force.

31. The method according to claim 23 further comprising a step of employing a computer for controlling said automatic coating the sidewall of at least one tire of a vehicle with a fluid.

32. The method according to claim 23 further comprising a step of removing water from the sidewall of the tire prior to engaging said applicator pad therewith.

33. The method according to claim 32 wherein the step of removing water from the tire includes drying the tire.

34. The method according to claim 32 wherein the step of removing water from the tire includes a step of wiping the sidewall of the tire.

35. The method according to claim 34 wherein the step of wiping the sidewall of the tire includes employing a wiper material on a surface of the applicator pad for wiping water from the sidewall of the tire prior to applying the fluid.

36. The method according to claim 23 wherein said fluid is a cleaner.

37. The method according to claim 23 further comprising the step of selecting an appropriate applicator pad based on a size of the tire of said vehicle.

38. In a vehicle wash facility, a method of automatically coating the sidewall of at least one tire of a vehicle with a fluid comprising the steps of:

automatically pumping a fluid into an elongated applicator pad;

engaging the applicator pad with a sidewall of said at least one tire;

rotating the tire while in engagement with the applicator pad to rub the pad over the entire sidewall applying fluid to the sidewall; and disengaging the applicator pad from the sidewall after the fluid has been applied to the sidewall.

39. The method of claim 38 wherein the step of pumping fluid into an elongated applicator pad includes a step of dispensing the fluid into a plurality of orifices defined by said applicator pad.

40. The method of claim 38 wherein the step of dispensing the fluid in a plurality of orifices includes dispersing the fluid into the applicator pad via at least one capillary connecting said orifices one to the other.

* * * * *

UNITED STATES PATENT AND TRADEMARK OFFICE
CERTIFICATE OF CORRECTION

PATENT NO. : 6,461,685 B2
DATED : October 8, 2002
INVENTOR(S) : William M. Gorra It is certified that error appears in the above-identified patent and that said Letters Patent is hereby corrected as shown below:

<u>Column 8,</u>
Line 50, the word "herein" should read -- wherein --.

Signed and Sealed this

Twenty-fifth Day of February, 2003

JAMES E. ROGAN
*Director of the United States Patent and Trademark Office*